United States Patent
Na et al.

(10) Patent No.: US 7,280,127 B2
(45) Date of Patent: Oct. 9, 2007

(54) SCANNING APPARATUS FOR LASER PRINTER

(75) Inventors: Gi Lyong Na, Kyunggi-Do (KR); Wook Hee Lee, Kyunggi-Do (KR); Kwan Young Oh, Kyunggi-Do (KR)

(73) Assignee: Samsung Electro-Mechanics Co., Ltd., Kyunggi-do (KR)

( * ) Notice: Subject to any disclaimer, the term of this patent is extended or adjusted under 35 U.S.C. 154(b) by 315 days.

(21) Appl. No.: 11/116,116

(22) Filed: Apr. 27, 2005

(65) Prior Publication Data

US 2006/0087551 A1    Apr. 27, 2006

(30) Foreign Application Priority Data

Oct. 13, 2004    (KR)    .................. 10-2004-0081664

(51) Int. Cl.
- *B41J 2/465*    (2006.01)
- *B41J 2/47*    (2006.01)
- *H04N 2/113*    (2006.01)
- *G02B 26/12*    (2006.01)

(52) U.S. Cl. .................. 347/135; 347/137; 347/261

(58) Field of Classification Search ............... 347/112, 347/129, 130, 134, 135, 137, 259, 261
See application file for complete search history.

(56) References Cited

U.S. PATENT DOCUMENTS

| | | | | |
|---|---|---|---|---|
| 4,205,348 A | * | 5/1980 | DeBenedictis et al. | 358/481 |
| 4,213,158 A | * | 7/1980 | DeBenedictis | 358/296 |
| 5,631,762 A | * | 5/1997 | Kataoka | 359/204 |
| 6,025,859 A | | 2/2000 | Ide et al. | |

* cited by examiner

*Primary Examiner*—Huan Tran
(74) *Attorney, Agent, or Firm*—Darby & Darby

(57) ABSTRACT

The present invention relates to a scanning apparatus for a laser printer. More particularly, the present invention relates to a scanning apparatus, which is formed to allow a light modulator to be non-perpendicular to the shaft of a photosensitive drum, which is a scanning object, thus performing scanning at a higher resolution and speed within the allowable limits of other devices.

The scanning apparatus of the present invention includes an optical means, a rotating mirror, a conversion means, and a drum-shaped scanning object.

2 Claims, 3 Drawing Sheets

SCANNING APPARATUS FOR LASER PRINTER

The present application claims the benefit of Republic of Korea Application No. 2004- 81664, filed Oct. 13, 2004, which is hereby incorporated by reference in its entirety.

BACKGROUND OF THE INVENTION

1. Field of the Invention

The present invention relates, in general, to a scanning apparatus for a laser printer and, more particularly, to a scanning apparatus, which is formed to allow a light modulator to be non-perpendicular to the shaft of a photosensitive drum, which is a scanning object, thus performing scanning at a higher resolution and speed within the allowable limits of other devices.

2. Description of the Related Art

A light beam scanning apparatus recently used in a laser printer is a device for scanning light beams, forming spots on a photosensitive medium with respect to the light beams and forming an image, in an image formation device, for example, a laser printer, a display device, a Light Emitting Diode (LED) printer, an electronic picture copier and a word processor.

With the development of image formation devices towards miniaturization, high speed and high resolution, the light beam scanning apparatus has been steadily researched and developed to be miniaturized and have high speed and high resolution characteristics to cope with the development of the image formation device.

Among recently popularized printers, a laser printer has attracted attention due to printing speed and quality higher than that of an ink-jet printer in the monochrome printer field.

FIG. 1 is a view showing a conventional scanning apparatus using a light modulator for a laser printer.

Referring to FIG. 1, if a laser diode 11 generates a laser beam, a collimator lens 12 converts the laser beam into collimated light, and converges the collimated light onto a multi-beam control light modulator 13.

The multi-beam control light modulator 13 diffracts and modulates the laser beam, converted into the collimated light, and outputs a plurality of (N) beams. A projection lens 15 converges the plurality of diffracted beams in the direction of the shaft of a rotating mirror 14.

In this case, if a slit 18 is disposed between the multi-beam control light modulator 13 and the rotating mirror 14, the slit 18 selectively passes therethrough beams having desired properties among the beams diffracted by the multi-beam control light modulator 13, thus transmitting the selected beams to the rotating mirror 14.

The diffracted beams, converged in this way, scan a drum 17 or a scanning object using a polygon mirror that moves at a constant linear velocity, or using a Galvano mirror that moves at a non-constant linear velocity.

At this time, the rotational speed of the rotating mirror 14 can be decreased in proportion to the number of beams output from the light modulator 13.

Accordingly, if the rotating mirror 14 is implemented as a polygon mirror, an F-θ lens 16 deflects the diffracted beams, reflected from the polygon mirror and moved at a constant angular velocity, in a main scanning direction, corrects aberration of the diffracted beams, and focuses and irradiates the aberration-corrected beams onto the surface of the photosensitive drum 17 or the scanning object.

If the rotating mirror 14 is implemented as a Galvano mirror, the F-θ lens 16 deflects the diffracted beams, reflected from the Galvano mirror and moved at a constant angular velocity, in a main scanning direction, corrects aberration of the diffracted beams, and focuses and irradiates the aberration-corrected beams onto the surface of the photosensitive drum 17 or the scanning object.

FIG. 2A illustrates a procedure of printing on paper performed by the scanning apparatus of FIG. 1.

The light modulator 13 has a structure in which 1080 mirror cells constituting a mirror cell array are typically arranged in a line. The scanning apparatus of FIG. 1 is constructed to allow the light modulator 13 to be perpendicular to the shaft of the photosensitive drum 17, so that the light modulator 13 scans 1080 vertically arranged pixels at one time on the photosensitive drum 17 while moving in a horizontal direction, as shown in FIG. 2A. If the horizontal length of a sheet of paper is 10,000 pixels, 1080×10,000 pixels are printed only when the light modulator 13 operates 10,000 times while crossing the paper along the horizontal length.

However, in this scheme, the light modulator 13 must operate a number of times corresponding to the number of pixels corresponding to the horizontal length of the paper in order to print a single line. However, the operational speed of the light modulator 13 is currently limited to a maximum of several hundred kHz. Therefore, the increase in scanning speed using this scheme is restricted by the limit to the operational speed of the light modulator 13.

Technology modifying the scanning apparatus of FIG. 1 and allowing the mirror cell array of the light modulator 13 to be parallel to the shaft of the photosensitive drum 17 is also well known. In this case, 1080 pixels are printed at one time in a horizontal direction. FIG. 2B illustrates a scanning process according to this scanning method.

However, in this scheme, 1080 pixels must be printed at one time in a horizontal direction, so that the rotational speed of a polygon mirror for reflecting the pixels must be very high. However, since the rotational speed of the polygon mirror is currently limited to about 20000 rpm, the increase in scanning speed using this scheme is restricted by the limit to the rotational speed of the polygon mirror 14.

As described above, the conventional vertical scanning scheme is fundamentally restricted by the limit to the operational speed of the light modulator, and the conventional horizontal scanning scheme is fundamentally restricted by the limit to the rotational speed of the polygon mirror. Therefore, a method of further increasing scanning speed while maintaining resolution within the allowable limits of the current rotational speed of the polygon mirror and the current operational speed of the light modulator is required.

In relation to this scheme, U.S. Pat. No. 6.025,859 discloses a laser printer using two light modulators to increase printing speed. However, the laser printer cannot fundamentally solve the above-described restrictions on printing speed.

SUMMARY OF THE INVENTION

Accordingly, the present invention has been made keeping in mind the above problems occurring in the prior art, and an object of the present invention is to provide a scanning apparatus, which uses a conventional light modulator and polygon mirror, thus realizing a higher resolution and operational speed.

In order to accomplish the above object, the present invention provides a scanning apparatus, comprising optical means for generating collimated light, diffracting and modulating the collimated light, and generating a plurality of diffracted beams; a rotating mirror rotating at a constant speed and refracting and reflecting the diffracted beams emitted from the optical means; conversion means for converting the diffracted beams, refracted and reflected by the rotating mirror, into light having a constant linear velocity; and a drum-shaped scanning object, the object being electrically charged according to the light received from the conversion means, the object having a shaft forming a non-perpendicular angle with respect to the optical means.

DESCRIPTION OF THE PREFERRED EMBODIMENTS

Figure 1:
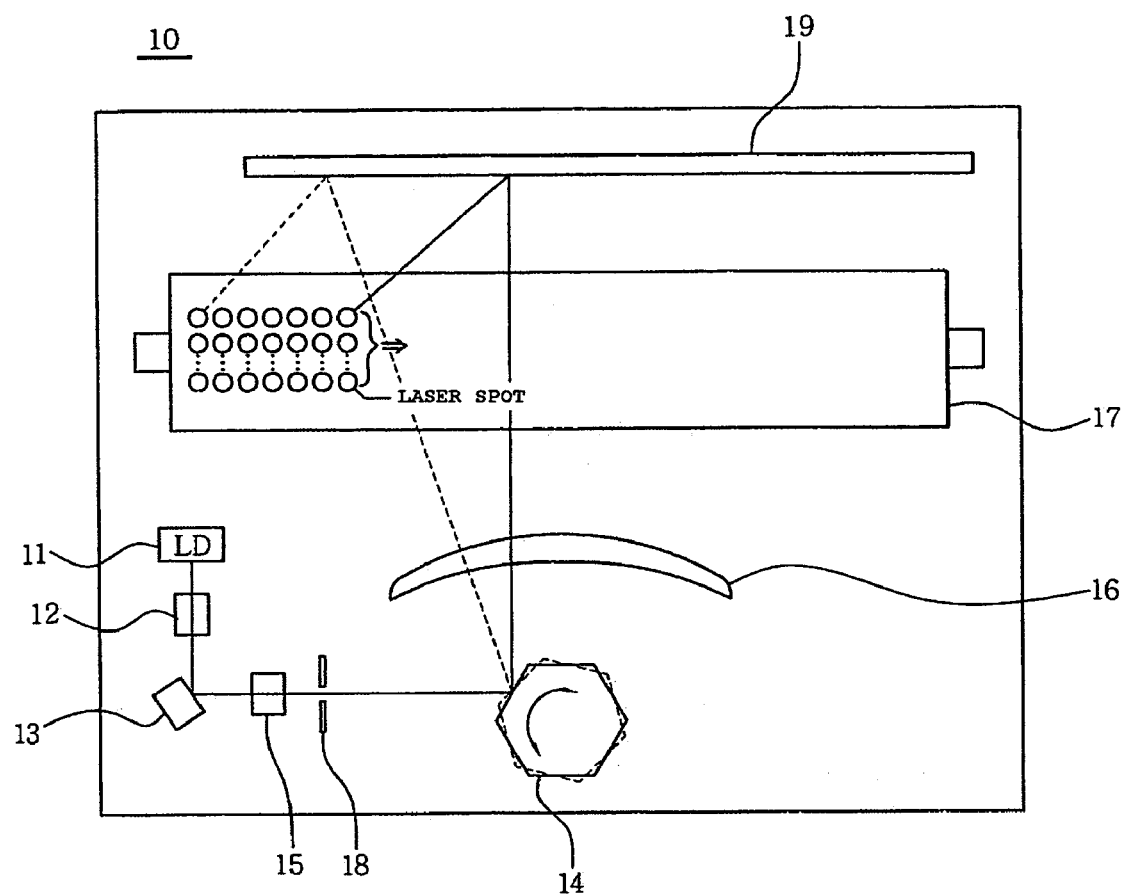
FIG. 1 is a view showing a conventional scanning apparatus for a laser printer using a light modulator.
Figure 2A:
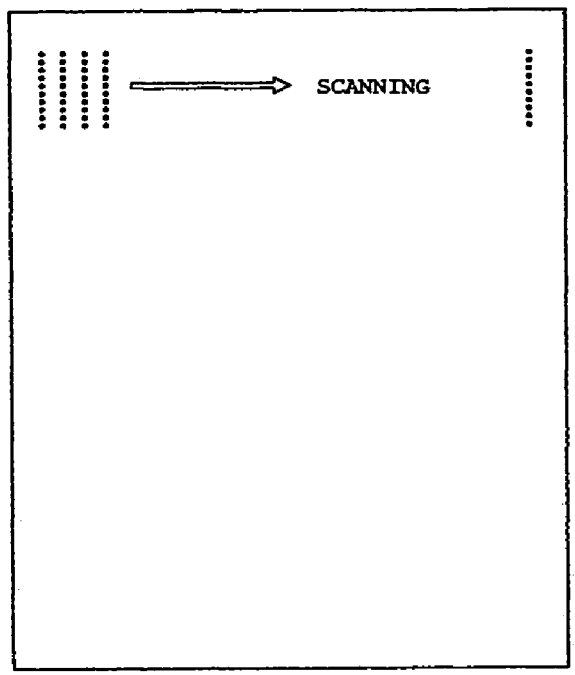
FIGS. 2A and 2B illustrate printing methods performed by conventional scanning apparatuses.
Figure 2B:
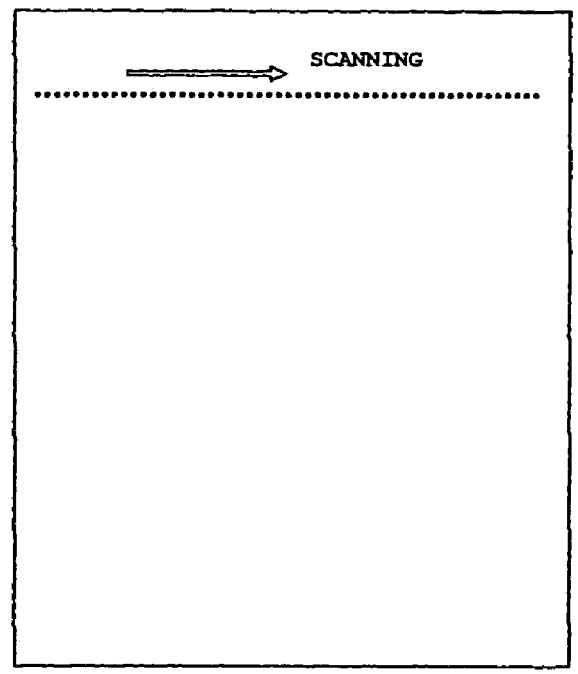

Hereinafter, embodiments of the present invention will be described in detail with reference to the attached drawings.

Reference now should be made to the drawings, in which the same reference numerals are used throughout the different drawings to designate the same or similar components.

Figure 3:
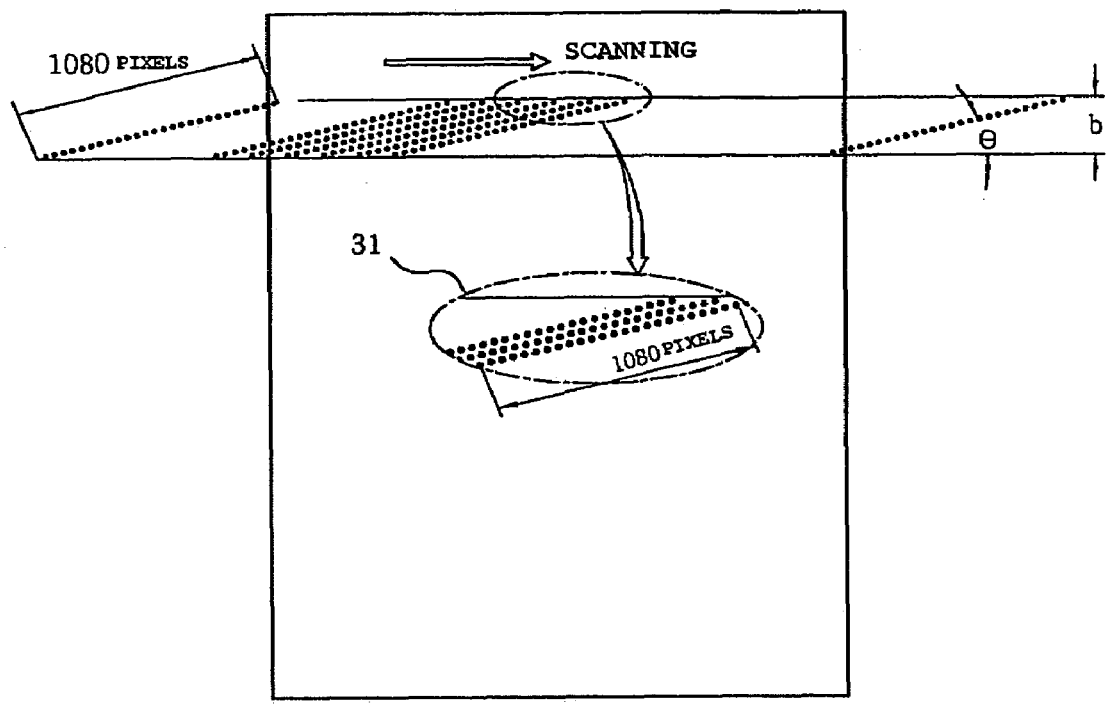
FIG. 3 illustrates a printing method performed by a scanning apparatus according to the present invention.

FIG. 3 illustrates a printing process performed by a scanning apparatus according to the present invention.

Unlike a conventional horizontal or vertical printing scheme, a 1080-device array in a light modulator scans a scanning object with light while forming a non-perpendicular angle of $\theta$ degrees with respect to the object.

Figure 4:
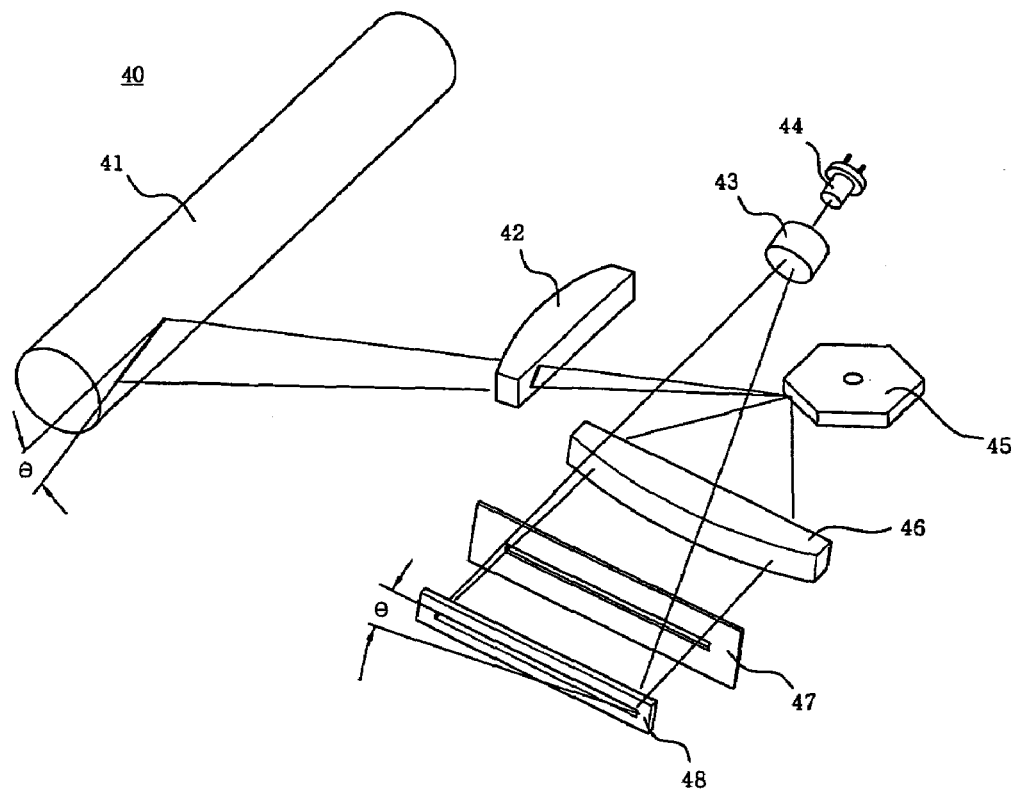
FIG. 4 is a view showing the construction of the scanning apparatus according to the present invention.

FIG. 4 is a view showing the construction of a scanning apparatus 40 according to the present invention.

As shown in FIG. 4, the scanning apparatus 40 includes a laser diode 44 for generating a beam, converting the beam into collimated light and emitting the collimated light, a collimator lens 43 for converting the light, emitted from the laser diode 44, into collimated light, a light modulation device array 48 for diffracting and modulating the collimated light and emitting a plurality of diffracted beams, a slit 47 for passing therethrough only specific diffracted light among the plurality of beams diffracted by the light modulation device array 48, a projection lens 46 for converging the diffracted light, having passed through the slit 47, onto a rotating mirror 45, the rotating mirror 45 for receiving the diffracted light and refracting the diffracted light in the direction of a photosensitive drum 41, an F-$\theta$ lens 42 for converting the light, refracted by the rotating mirror 45, into light having a constant linear velocity, and the photosensitive drum 41 adapted to receive the diffracted light and electrically charged according to the received light.

The operation of the scanning apparatus of FIG. 4 is described in detail. If the laser diode 44 generates a laser beam, the collimator lens 43 converts the laser beam into collimated light, and converges the collimated light onto the light modulation device array 48.

The light modulation device array 48 diffracts and modulates the laser beam, converted into collimated light, emits 1080 0th-order and ±1st-order diffracted beams, and passes the 0th-order or ±1st-order diffracted beams among the diffracted beams through the slit 47. Then, the projection lens 46 converges the diffracted beams onto the reflective surface of the rotating mirror 45. The light modulation device array 48 is typically composed of 1080 pixel units, however, this number can be changed according to the embodiment.

The diffracted beams, converged in this way, are converted into light having a constant linear velocity by the F-$\theta$ lens 42, and then scan the photosensitive drum 41 or a scanning object.

Preferably, the rotating mirror 45 is a polygon mirror. If the rotating mirror 45 is implemented as a polygon mirror, the F-$\theta$ lens 42 deflects the plurality of diffracted beams, reflected from the polygon mirror and moving at a constant angular velocity, in a main scanning direction, corrects aberration of the diffracted beams, and scans the surface of the photosensitive drum 41 or the scanning object with the plurality of diffracted beams having a constant linear velocity.

In this case, in order to perform printing in the shape of FIG. 3, the plane on which the light modulation device array 48, the slit 47 and the projection lens 46 are arranged forms a non-perpendicular angle of $\theta$ degrees with respect to the plane on which other devices are arranged. Accordingly, the light modulation device array 48 and the shaft of the photosensitive drum 41 form a non-perpendicular angle of $\theta$ degrees.

The laser diode 44, the collimator lens 43, the light modulation device array 48, the slit 47 and the projection lens 46 are preferably inclined at the same angle with respect to other devices.

In FIG. 3, if the number of pixels corresponding to the horizontal direction of a scanning object is 10800, and the number of pixels formed in the vertical direction of the inclined 1080-pixel array, that is, the number of pixels vertically formed during a single scan, is b, the number of times the light modulation device array must be operated during a single scan in a horizontal direction is obtained by the following equation.

Number of operations of light modulation device array for horizontal scanning=$10800/(1080/b)+b$ For example, if b is 10 pixels, $10800/(1080/10)+10=110$ is obtained, so that the light modulation device array is operated 110 times to print a single horizontal line composed of 10 pixels. The value of $\theta$ can be adjusted according to the operational speed of the light modulation device array.

By adjusting the value of $\theta$, the optimal combination of the diameter of the photosensitive drum 41, the operational speed of the light modulation device and the rotational speed of the polygon mirror is detected, thus performing scanning at high resolution and high speed.

As described above, the present invention provides a scanning apparatus, which uses a conventional light modulator and polygon mirror, thus providing an improved scanning apparatus having higher resolution and operating at higher speed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A scanning apparatus, comprising:
   optical means for generating collimated light, diffracting and modulating the collimated light, and generating a plurality of diffracted beams;
   a rotating mirror rotating at a constant speed and refracting and reflecting the diffracted beams emitted from the optical means;
   conversion means for converting the diffracted beams, refracted and reflected by the rotating mirror, into light having a constant linear velocity; and
   a drum-shaped scanning object, the object being electrically charged according to the light received from the conversion means, the object having a shaft forming a non-perpendicular angle with respect to the optical means.

2. The scanning apparatus according to claim 1, wherein the optical means comprises:
   light generation means for generating a beam, converting the beam into collimated light, and emitting the collimated light; and
   light modulation means for diffracting and modulating the collimated light, emitted from the light generation means, and emitting the plurality of diffracted beams.

* * * * *